United States Patent
Ren et al.

(10) Patent No.: US 11,914,999 B2
(45) Date of Patent: Feb. 27, 2024

(54) METHOD FOR ACCELERATING DEEP NEURAL NETWORKS EXECUTION WITH ADVANCED OPERATOR FUSION

(71) Applicant: William and Mary University, Williamsburg, VA (US)

(72) Inventors: Bin Ren, Williamsburg, VA (US); Wei Niu, Williamsburg, CA (US)

(73) Assignee: William and Mary University, Williamsburg, VA (US)

( * ) Notice: Subject to any disclaimer, the term of this patent is extended or adjusted under 35 U.S.C. 154(b) by 0 days.

(21) Appl. No.: 17/842,748

(22) Filed: Jun. 16, 2022

(65) Prior Publication Data

US 2022/0413862 A1 Dec. 29, 2022

Related U.S. Application Data (60) Provisional application No. 63/211,644, filed on Jun. 17, 2021.

(51) Int. Cl.
*G06F 9/30* (2018.01)
*G06F 9/345* (2018.01)

(52) U.S. Cl.
CPC .......... *G06F 9/30145* (2013.01); *G06F 9/345* (2013.01)

(58) Field of Classification Search
CPC ........ G06F 9/30145; G06F 9/345; G06N 3/02
See application file for complete search history.

(56) References Cited

U.S. PATENT DOCUMENTS

| | | | | |
|---|---|---|---|---|
| 2021/0182036 | A1* | 6/2021 | Shafiq | G06N 3/063 |
| 2021/0400315 | A1* | 12/2021 | Kale | G06N 3/08 |
| 2022/0374288 | A1* | 11/2022 | Kibardin | G06N 3/04 |

* cited by examiner

*Primary Examiner* — Zachary K Huson
(74) *Attorney, Agent, or Firm* — Javalon Law, PC (57) ABSTRACT

This disclosure has presented a new loop fusion framework called DNNFusion. The key advantages of DNNFusion include: 1) a new high-level abstraction comprising mapping type of operators and their combinations and the Extended Computational Graph, and analyses on these abstractions, 2) a novel mathematical-property-based graph rewriting, and 3) an integrated fusion plan generation. DNNFusion is extensively evaluated on 15 diverse DNN models on multiple mobile devices, and evaluation results show that it outperforms four state-of-the-art DNN execution frameworks by up to 8.8× speedup, and for the first time allows many cutting-edge DNN models not supported by prior end-to-end frameworks to execute on mobile devices efficiently (even in real-time). In addition, DNNFusion improves both cache performance and device utilization, enabling execution on devices with more restricted resources. It also reduces performance tuning time during compilation.

13 Claims, 7 Drawing Sheets

METHOD FOR ACCELERATING DEEP NEURAL NETWORKS EXECUTION WITH ADVANCED OPERATOR FUSION

CROSS-REFERENCE TO RELATED APPLICATIONS

The application claims priority to U.S. Provisional Patent Application 63/211,644 filed Jun. 17, 2021, entitled "METHOD FOR ACCELERATING DEEP NEURAL NETWORKS EXECUTION WITH ADVANCED OPERATOR FUSION," the entire disclosure of which is incorporated herein by reference.

BACKGROUND

Deep Neural Networks (DNNs) have emerged as the core enabler of many major applications on mobile devices. To achieve high accuracy, DNN models have become increasingly deep with hundreds or even thousands of operator layers, leading to high memory and computational requirements for inference. Operator fusion (or kernel/layer fusion) is critical for optimization in many state of the art DNN execution frameworks that aim to improve the efficiency of the DNN inference. However, these frameworks usually adopt fusion approaches based on certain patterns that are too restrictive to cover the diversity of operators and layer connections, especially those seen in many extremely deep models. Polyhedral-based loop fusion techniques work on a low-level view of the computation without operator-level information and can also miss potential fusion opportunities.

The past ten years have witnessed a resurgence of Machine Learning, specifically in the form of Deep Learning. Deep Neural Networks (DNNs) such as Convolution Neural Networks (CNN) and Recurrent Neural Networks (RNN) serve as the state-of-the-art foundation and core enabler of many applications that have only emerged within the last few years and yet have become extremely popular among all users of computing today. Behind the success of deep learning are the increasingly large model sizes and complex model structures that require tremendous computation and memory resources. There is a difficult trade-off between increasing complexity of DNNs (required for increasing accuracy) and deployment of these DNNs on resource constrained mobile devices (required for wider reach).

In recent years, there has been a significant emphasis on optimizing the execution of large DNNs. Operator fusion (or kernel/layer fusion) has been a common approach towards improving efficiency of DNN execution. The basic idea of such fusion is the same as the traditional loop fusion done by optimizing compilers, and they lead to the following benefits: (i) eliminating unnecessary materialization of intermediate results, (ii) reducing unnecessary scans of the input; and (iii) enabling other optimization opportunities. Traditional end-to-end frameworks like TensorFlow Lite, TVM, MNN, and Pytorch-Mobile all have operator fusion optimizations, which are broadly based on recognizing certain fusion patterns. These transformations have generally been based on a representation called computational graph, which views the application as a set of operations on tensors, and representation of dependencies in the form of consumption of tensor(s) output of one operation by another operation.

In this disclosure, we observe that the fusion patterns considered in the past work are too restricted to cover the diversity of operators and layer connections that are emerging. For example, ONNX (Open Neural Network Exchange) lists 167 distinct operators, and creating fusion patterns based on their combinations is unlikely to be a feasible approach. At the same time, traditional compiler loop transformations (including fusion) work on a low-level view of the computation, i.e., loop (indices) and dependence between array elements. More recent work on loop fusion has been based on polyhedral analysis, with several different resulting algorithms. Polyhedral analysis, while providing an excellent foundation to rigorously reason the legality of, and explore the space of, loop transformations, can be an "overkill" to capture the relatively simple data structures (tensors) and operations (without loop-carried dependencies) in DNNs. Moreover, polyhedral analysis is normally limited to affine-loop analysis and transformations (although latest efforts do extend it to certain non-affine loop optimizations), and cannot capture certain operation (combinations) in DNNs. An example will be a combination of Gather, which copies input to output indirectly using an index array followed by Flatten, which changes the dimensionality of a tensor. Finally, the operator view in computational graphs can enable us to exploit properties of these computations, which may be lost when a lower-level view of the computation is considered.

To address these challenges, we describe herein a novel and extensive loop fusion framework which we call DNN-Fusion.

SUMMARY

Herein we describe a method for accelerating deep neural networks comprising the steps of: classifying operators into one of five high-level abstract types; performing a mapping type analysis for each paired input and input; classifying mapping types into one of three classes; providing a computational graph; rewriting said computational graph; and generating and optimizing the fusion code.

This approach works at an operator view of DNNs, but expands fusion opportunities by developing a classification of both individual operators and their combinations. In addition, DNNFusion includes (i) a novel mathematical property-based graph rewriting framework to reduce evaluation costs and facilitate subsequent operator fusion; (ii) an integrated fusion plan generation that leverages high-level analysis and accurate light-weight profiling, and (iiii) additional optimizations during fusion code generation.

The methods have been extensively evaluated on 15 DNN models with various types of tasks, model sizes, and layer counts. The evaluation results demonstrate that DNNFusion can identify up to 8.8× higher fusion opportunities and can outperform prior art DNN execution frameworks with nearly 10× speedup. The memory requirement reduction and speedups can enable the execution of many of the target models on mobile devices, and can even make them part of a real-time application.

DESCRIPTION OF DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

When practical, similar reference numbers denote similar structures, features, or elements.

DETAILED DESCRIPTION OF THE INVENTION

This application presents DNNFusion, a rigorous and extensive loop fusion framework that can exploit the operator view of computations in DNNs, and yet can enable a set of advanced transformations. The core idea is to classify operators into different types, and develop rules for different combinations of the types, as opposed to looking for patterns with specific combination of operations. Particularly, we first classify the existing operations in a DNN into several groups based on the mapping between their input and output, such as One-to-One, One-to-Many, and others. We also enhance the computational graph representation into the Extended Computational Graph (ECG) representation, where the type (and other properties) of the operation are explicitly noted. Then, we design a mapping type analysis to infer the profitability of fusing operations of different combinations of these types of operators, binning the combination into three groups: likely profitable (and legal), likely not profitable, and ones where profitability may need to be determined through profile information.

Next, on the ECG representation, we apply a series of graph rewriting rules that we have developed. These rules exploit the mathematical properties of the operations and have a similar flavor to the classical optimization called strength reduction. Unlike traditional compiler work, however, we apply these rules on operations on tensors (and not scalars) and our set of rules go well beyond the traditional ones. The rest of our framework comprises algorithms for determining fusion of specific operations (based on certain heuristics) and generating optimized fused code. Almost each fusion generates a new operator (and its implementation) that is not present in the original library; however, once a new operator is generated, its implementation can be reused when the same pattern is detected in the same or a different model. Overall, we show that an operator view of the DNN can enable rigorous optimizations, beyond what will be possible with a lower-level view of the computation or the existing (simplistic) work on applying a small set of fusion patterns on the operator view.

In summary, this application makes the following contributions:

It designs high-level abstractions (including mapping type analysis and ECG) for operator fusion by leveraging high_level DNN operator information. The approach can handle a diversity of operators and yet enable aggressive optimizations.

It proposes a novel mathematical-property-based graph rewriting to simplify ECG structure, optimize DNN computations, and facilitate subsequent fusion plan generation.

It presents an integrated fusion plan generation by combining the benefit of efficient machine-independent mapping type analysis while leveraging a profiling result database.

It implements optimized fusion code generation, integrating the approach into a state-of-the-art end-to-end DNN execution framework. The optimized framework with operator fusion is called DNNFusion.

DNNFusion is extensively evaluated on 15 cutting-edge DNN models with 5 types of tasks, varied model sizes, and different layer counts on mobile devices. Comparing with four popular state-of-the-art end-to-end DNN execution frameworks, MNN, TVM, TensorFlow-Lite, and Pytorch-Mobile, DNNFusion achieves up to 8.8× more loop fusions, 9.3× speedup with our proposed advanced operator fusion. Particularly, DNNFusion for the first time allows many latest DNN models that are not supported by any existing end-to-end frameworks to run on mobile devices efficiently, even in real-time. Moreover, DNNFusion improves cache performance and device utilization—thus, enabling execution on devices with more restricted resources—and reduces performance tuning time during compilation.

TABLE 1

Classification of DNN operators in mapping types.
These operators are defined in ONNX.

| Mapping type | Operators |
| --- | --- |
| One-to-One Add, Relu | Add, Asin, BatchNormalization, Cast, Ceil, Clip, Concat, Cos, Erf, Exp, Greater, LeakyRelu, Log, Not, PRelu, Reciprocal, Relu, Round, Sigmoid, Sin, Slice, Split, Sqrt, Tanh, Where |
| One-to-Many Expand | Elementwise w/ broadcast, Expand, Gather, Resize, Upsample |
| Many-to-Many Conv, GEMM | AveragePool, CONV, ConvTranspose, CumSum, Einsum, GEMM, InstanceNormalization, MaxPool, Reduce (e.g. ReduceProd, ReduceMean), Softmax |
| Reorganize Reshape | Flatten, Reshape, Squeeze, Unsqueeze |
| Shuffle Transpose | DepthToSpace, SpaceToDepth, Transpose |

TABLE 2

An empirical study to motivate this work: The relation of overall computation, layer count, and execution efficiency of multiple DNNs. Results are collected on Qualcomm Adreno 650 GPU with an optimized baseline framework with fixed-pattern operator fusion that outperforms all state-of-the-art DNN execution frameworks (called OurB+ and will be introduced later).

| Model | # Total layer | IR size | #FLOPS | Speed (FLOPs/S) |
| --- | --- | --- | --- | --- |
| VGG-16 | 51 | 161M | 31.0B | 320G |
| YOLO-V4 | 398 | 329M | 34.6B | 135G |
| DistilBERT | 457 | 540M | 35.3B | 78G |

TABLE 2-continued

An empirical study to motivate this work: The relation of overall computation, layer count, and execution efficiency of multiple DNNs. Results are collected on Qualcomm Adreno 650 GPU with an optimized baseline framework with fixed-pattern operator fusion that outperforms all state-of-the-art DNN execution frameworks (called OurB+ and will be introduced later).

| Model | # Total layer | IR size | #FLOPS | Speed (FLOPs/S) |
|---|---|---|---|---|
| MobileBERT | 2,387 | 744M | 17.6B | 44G |
| GPT-2 | 2,533 | 1,389M | 69.1B | 62G |

This section presents a study that motivates our work, by demonstrating that it is challenging to execute deep(er) neural networks efficiently, particularly on resource-constraint mobile devices, due to the high memory and computation requirements.

As we stated earlier, there has been a trend towards deeper DNNs. With increasing amount of communication, there has also been a trend towards reducing the computation by reducing the weight size. Consider the well-known Natural Language Processing (NLP) model, BERT as an example. TFLite takes 985 ms to inference BERT on the latest CPU of Snapdragon 865. In recent efforts (MobileBERT, GPT-2), machine learning researchers have addressed this issue by reducing the weight size on each layer and thus training thinner and deeper models to balance the computation workload and model accuracy.

However, we have observed that the depth of the model is the critical impediment to efficient execution. Our experimental study has correlated execution efficiency with the total amount of computation and the number of layers (Table 2). Particularly, we can see that although DistilBERT and VGG-16 have a similar number of computations (while having 457 and 51 layers, respectively), DistilBERT's execution performance (78 GFLOPs/S) is much worse than VGG's (320 GFLOPs/S). This is mainly because of two reasons. First, models with more layers usually generate more intermediate results, thus increasing the memory/cache pressure. Second, deep models usually have an insufficient amount of computations in each layer, thus degrading the processor's utilization, particularly for GPUs. Operator fusion can be an effective technique to reduce memory requirements and improve efficiency, and is the focus of the present disclosure.

1. Classification of DNN Operators and Fusion Opportunity Analysis

This section establishes the basis for our approach, by classifying DNN operators and their combinations.

1.1 DNN Operators Classification

This work carefully studied all operators supported by a popular (and general) DNN ecosystem ONNX (Open Neural Network Exchange), and finds that the mapping relation between (each) input and output of each operator is critical to determine both the profitability and correct implementation of fusion optimization. Moreover, it is possible for us to classify all operators into five high-level abstract types based on the relationship between input elements and output elements. These five types are One-to-One, One-to-Many, Many-to-Many (which includes Many-to-One, but we do not consider it separately here), Reorganize, and Shuffle. This classification serves as the foundation of our proposed fusion framework. Table 1 shows more details of this operator classification and gives one or two representative examples for each mapping type. If an operator has only one input or multiple inputs with the same mapping type to the output, the mapping type of this operator is decided by its any input/output pair. If multiple input/output pairs with varied mapping types exist, this operator's mapping type is decided by the more complex mapping type.

For the following discussion, x denotes an operand (or input) of an operator. $d_1, d_2, \ldots, d_n$ denote the dimensions of a particular tensor, representing either the output tensor if they are on the left side of an equation, or the input tensor if they are on the right side. $e_1, e_2, \ldots, e_n$ denote the dimensions of the corresponding output tensor of the operator. n means the n-th dimension of the tensor. F denotes the computation function associated with an operator. For example, in Convolution operator, F means the sliding window computation pattern; while in Activation operator, F means the activation computation pattern (e.g., Sigmoid, ReLU). $f_1, f_2, \ldots, f_n$ denote the output tensor index transfer functions, each of which takes an input index from the input tensor and produces the corresponding transferred value as the output index.

With the above notations, the mapping types between one input of an operator and one corresponding output may be classified as follows according to one embodiment of the present invention.

One-to-One: There is a set of functions F, $f_1, \ldots, f_n$, such that $$y[d_1, \ldots, d_n] = F(x[f_1(d_1), \ldots, f_n(d_n)])$$

There is a direct one-to-one mapping relationship between the input and output elements. The input and output data have the same rank1. Here, "rank" means the number of dimensions in a matrix. In most of the cases, $f(d)=d$. However, $f$ could be a linear transformation function. For example, in Slice operator, $f(d)=d+n$ (where n is considered as a constant value throughout the computation)

One-to-Many: There is a set of functions F, $f_1, \ldots, f_n$, such that:

$$y[e_1, \ldots, e_m] = F(x[f_1(d_1), \ldots, f_n(d_n)])$$

where m>n, and there is a One-to-Many relationship between $[f_1(d_1), \ldots, f_n(d_n)]$ and $[e_1, \ldots, e_m]$. In other words, each input element will be used for the generation of multiple output elements. The definition of this category is almost the same as One-to-One except for the rank of output data.

Many-to-Many: There is a set of functions F, $f_1^1, \ldots, f_n^1, \ldots, f_1^k, \ldots, f_n^k$, such that:

$$y[e_1, \ldots, e_m] = F(x^1[f_1^1(d_1), \ldots, f_n^1(d_n)], \ldots, x^k[f_1^k(d_1), \ldots, f_n^k(d_n)])$$

In this category, each input element is used to generate multiple output elements. Similarly, each output element is derived from a computation involving multiple input elements. This category can be classified as One-to-Many. The key distinction between the two equations lies in the fact that each element of y corresponds to multiple input elements of x. Therefore, on the right side of the equation, we use $x^1, \ldots, x^k$ to denote this relationship, where the index transformation functions are applied for each input element (as indicated by the notation:

$x^k[f_1^k(d_1), \ldots, f_n^k(d_n)]$, k means the k-th input element).

Reorganize: We have $$y[e_1, \ldots, e_m] = x[f_1(d_1), \ldots, f_n(d_n)]$$

and there is a 1-1 relationship between each $[e_1, \ldots, e_m]$ and the corresponding $[f_1(d_1), \ldots, f_n(d_n)]$. More specifically, the input and output are the same if we linearize their data into a one-dimensional array. However, the input and output are in different shapes. $f$ is an index transformation function.

Shuffle: There is a set of functions F, $f_1, \ldots, f_n$, where F is a permutation function, such that, $$y[e_1, \ldots, e_n] = x[f_1(d_{F(1)}), \ldots, f_n(d_{F(n)})].$$

TABLE 3

Mapping type analysis. The first column and the first row (both without color) show the mapping types of first and second operators, respectively, before fusion, and the cells show the mapping type of the operator after fusion (labeled with different color designation in parentheses). Green labeled cell implies that these fusion combinations can be fused directly (i.e., they are profitable). Red labeled cell implies that these fusions are unprofitable. Yellow labeled cell implies that further profiling is required to determine profitability.

| | Second op | | | | |
|---|---|---|---|---|---|
| First op | One-to-One | One-to-Many | Many-to Many | Reorganize | Shuffle |
| One-to-One | One-to-One (green) | One-to-Many (green) | Many-to Many (green) | Reorganize (green) | Shuffle (green) |
| One-to-Many | One-to-Many (green) | One-to-Many (yellow) | X (red) | One-to-Many (yellow) | One-to-Many (yellow) |
| Many-to Many | Many-to-Many (green) | Many-to-Many (yellow) | X (red) | Many-to-Many (yellow) | Many-to-Many (yellow) |
| Reorganize | Reorganize (green) | One-to-Many (yellow) | Many-to-Many (yellow) | Reorganize (green) | Reorganize (green) |
| Shuffle | Shuffle (green) | One-to-Many (yellow) | Many-to-Many (yellow) | Reorganize (green) | Shuffle (green) |

1.2 Fusion Opportunity Analysis

Based on the mapping type of each operator, this application discloses a new fusion analysis. The basic idea is that given two fusion candidate operators with a certain combination of mapping types, it is possible to: 1) infer the mapping type of the resulting fused operation; and 2) simplify the profitability evaluation and correct implementation of the resulting fusion.

Table 3 shows the details of this analysis. The first column and the first row (without any color) show the mapping types of the first and the second operator to be fused and the color-labeled cells show the mapping type of the resulting operator. It further classifies the fusion of this combination of mapping types into three groups (labeled as green, yellow, and red, respectively). Green group implies that these fusions are legal and profitable and no further analysis is required. Red group implies that these fusions are known to be either illegal or clearly not profitable. Yellow group implies that these fusions are legal; however, further profiling is required to determine profitability. This analysis eliminates the need for anytime runtime analysis or auto-tuning for red and green cases. For remaining (yellow) cases, we can further accelerate compilation using a profiling database that stores the execution results of various fusion combinations collected offline.

These five mapping types have a range of what we call transformation impedance (which we informally define as a metric to qualitatively express the difficulty to fuse), i.e., when they are fused with another type, they have different capability of dictating the fused mapping type. One-to-One has the lowest trans-formation impedance among all five types, whereas Reorganize and Shuffle's transformation impedance is in the middle, i.e., they can transform One-to-One to their types while they cannot transform others. One-to-Many and Many-to-Many have the strongest transformation impedance, i.e., the resulted mapping type is decided by them solely when they are fused with other operators. Moreover, in terms of capability of dictating the mapping type of the fused operator, One-to-Many and Many-to-Many are at the same or similar level, and Reorganize and Shuffle are at the same or similar level.

We elaborate on the following representative combinations to provide intuition behind the Table 3.

One-to-One with others. When a One-to-One operator ($Op_1$ with the input I and the output O) is fused with an operator of any type ($Op_2$), i.e., $Op_2$ takes O as the input, the memory access to each element of O can be mapped to the access to each element of I, as long as this mapping function is known. Unlike general programs with pattern based operator fusion where the dependencies can be more complex, the use of tensors and a limited set of operators limits the type of mappings, and DNN operators carry this mapping information. Our analysis leverages this high-level operator information to ensure the correctness of these fusions. Moreover, this fusion usually requires limited number of registers and does not incur extra overhead like data copying or redundant computations, so they are profitable. Take a case that fuses an Add operator and an GEMM operator in either order as an example. Each element in the output of an Add operator can be replaced by the corresponding two elements in the corresponding two inputs of that Add operator, ensuring correct and profitable fusion for the Add operator and the GEMM operator, irrespective of the order of these operations.

Reorder or Shuffle with others. Both types are variants of One-to-One with a special mapping function between the input and the output. Above reasons for the correctness analysis are also applied here; however, when fusing with One-to-Many or Many-to-Many types operators, profitability needs to be validated with further profiling because of the possibility of additional data copying, change in data access order, or redundant computations and so on as a result of the fused operation. As an example, consider Expand and Transpose operators—an Expand operator copies the input tensor with a continuous memory access pattern, whereas, a Transpose operator transposes the input tensor to the output tensor according to the permutation in operator properties. Thus, the resulting fused operation may not have continuous memory accesses, therefore the fused operation is invalid or undesirable.

One-to-Many with Many-to-Many. Take the case that Expand followed by Conv—as Conv reads the feature map input tensor with continuous access, while a One-to-Many operator can distribute the continuous input tensor elements. As it is very desirable for the (compute-intensive) Many-to-Many operators to read the input tensors in a continuous way, we consider this fusion unprofitable.

Many-to-Many with Many-to-Many. When a Many-to-Many mapping operator is followed by a Many-to-One operator, e.g. Conv followed by another Cony, attempting a combined execution will be too complicated and will likely negatively impact register and cache usage. Thus, we consider them unprofitable.

Many-to-Many with One-to-Many. When a Many-to-Many mapping operator is followed by a One-to-Many operator, e.g. an Conv operator followed by an Expand or Resize operator, a combined execution may or may not have a desirable data access pattern. When an Conv operator is combined with an Expand operator, as Expand operator only expands a single dimension of the input, so it will not adversely affect the computation pattern of the Conv operator, therefore, this would be a profitable fusion. On the other hand, if a Cony operator is combined with a Resize operator that will copy the input tensor along different dimensions, it can negatively impact the computation of the Conv operation. Thus, we consider such cases to be requiring further profiling.

Extended Computational Graph. Based on the analysis above and as a background for the methods we will present next, we introduce Extended Computational Graph (ECG) as our intermediate representation (IR). As the name suggests, this representation builds on top of the (traditional) Computational Graph, which captures the data-flow and basic operator information like the operator type and parameters. ECG contains more fusion-related information, including mapping_type indicating the mapping type of each operator, IR_removable denoting if an intermediate result can be removed completely (which is true only if all its successors can be fused and which is calculated during fusion), and mathematical properties of the operations like whether the associative, commutative, and/or distributed properties hold.

2. DNNFusion's Design 2.1 Overview of DNNFusion

Figure 1:
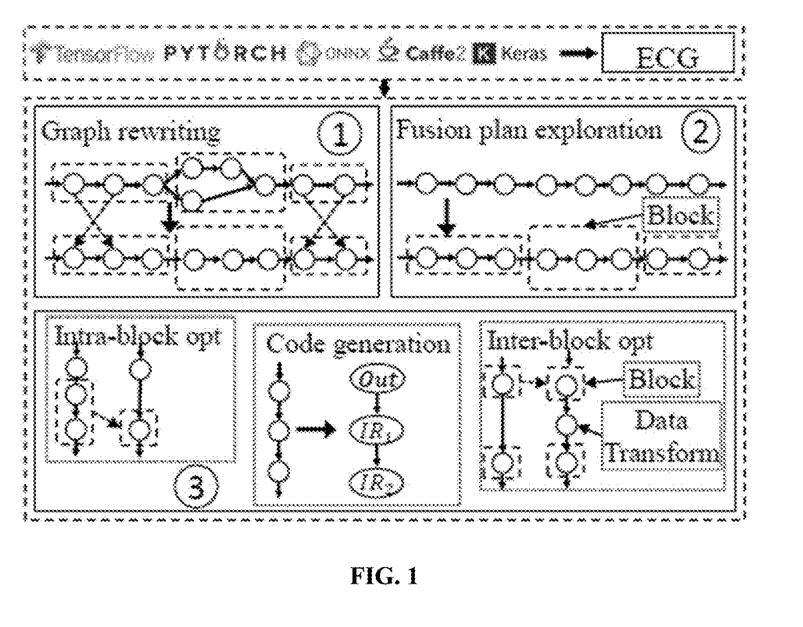
FIG. 1 illustrates an overview of DNNFusion.

FIG. 1 shows an DNNFusion embodiment of the present invention. It takes the computational graph generated from compiler-based DNN execution frameworks (e.g., TVM, and MNN) as the input, and adds key information to create the Extended Computational Graph (ECG). Based on this ECG, the main compiler optimization and code generation stage of DNNFusion consists of three components: (1) mathematical-property-based graph rewriting (Section 2.2), (2) lightweight profile-driven fusion plan exploration (Section 2.3), and (3) fusion code generation and other advanced fusion-based optimizations (Section 2.4).

2.2 Mathematical-Property-Based Graph Rewriting

DNNFusion first employs a mathematical-property based graph rewriting pass to optimize the Extended Computational Graph (ECG). With this pass, DNNFusion is able to 1) remove unnecessary operations, 2) eliminate redundant intermediate data copies, and 3) replace costly (combination of) operators with more efficient ones. This graph rewriting carried out here is in the spirit of the classical compiler optimization of strength reduction; however, here it is performed on complicated operators on matrices or tensors rather than on scalar expressions. Moreover, the rules we present are more complex and involved, and are based on operations that are common in DNNs. More importantly, compared to existing efforts on computational graph substitution (e.g., TASO), our graph rewriting is designed to work in conjunction with operator fusion and identifies a set of operators and rules for that specific purpose. Our evaluation results (Section 3) show that with graph rewriting, there are 18% fewer fused layers left after fusion on GPT-2. We also do an experimental comparison against TASO later in this disclosure.

Figure 2:
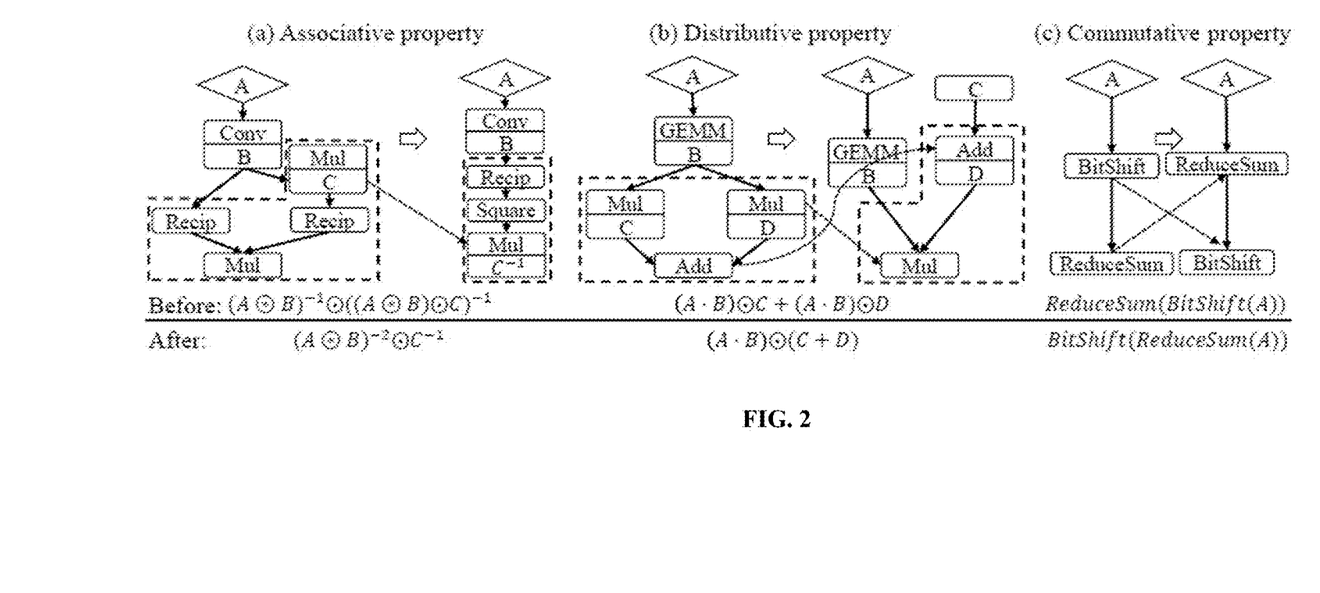
FIG. 2 illustrates specific examples of leveraged mathematical properties (distributive, communicative, and associative).

FIG. 2 shows specific examples of leveraged mathematical properties (distributive, communicative, and associative). Table 4 shows a more complete set of rules. This table also shows the computation size (in #FLOPS) before and after the rewriting. Our rules mainly focus on operators in the One-to-One mapping type (e.g., element-wise multiplication, addition, reciprocal, square root, and others) and several reduction operators that are in Many-to-Many (e.g., Reduce Sum and ReduceProd)—this is because these operators usually follow our defined mathematical properties. DNNFusion uses #FLOPs (rather than temporary output size or memory footprint) as the metric to drive graph rewriting mainly because of two reasons: first, in most of the applications scenarios of these rules, the temporary output size remains the same before and after graph rewriting, and second, the size of the temporary output in a majority of other cases becomes a non-issue because fusion is applied after rewriting. For a small number of remaining cases, i.e., where temporary output size changes and the fusion is not applied, more sophisticated methods will be considered in the future.

We now elaborate on some of the rules presented in Table 4, which were also depicted in FIG. 2.

Associative: By leveraging the associative property, the graph rewriting pass can identify an optimized order of operators execution, and hence replace the expensive combination of operators with a new cheaper one. FIG. 2 (a) shows an example, in which a combination of two Recip operators and two Mul operators is replaced by a combination of a Recip, a Square, and a Mul. The latter is more efficient as it eliminates a Mul operator and the intermediate result size is significantly reduced, leading to reduced register pressure after subsequent fusion.

Distributive: Following the same ideas as above, applying distributive property also enables computation opportunities. As shown in FIG. 2 (b), the combination of two Mul operators and an Add can be replaced by an Add followed by a Mul, thus eliminating an unnecessary MUL operator.

Commutative: The property guaranties the legality of swapping the position of two operators, which usually results in computation reduction. As shown in FIG. 2 (c), BitShift and ReduceSum satisfy communicative property, thus ReduceSum can be scheduled to execute before BitShift, reducing the number of elements on which BitShift is applied.

According to some aspect of the present disclosure, DNNFusion employs pattern matching to recognize rewriting candidates. However, associative and commutative matching is an NP-complete problem. Therefore, DNNFusion first partitions the entire Extended Computational Graph into many sub-graphs by considering operators with neither of associative, communicative, or distributive properties as partitioning points within the original graph. Within each sub-graph, DNNFusion can explore all possible patterns and pattern combinations because these sub-graphs have limited number of operators. More specifically, all matching rules within a partition are considered and the rule leading to the largest reduction in #FLOPS is applied. This process is repeated till there are no additional matching rules within the partition. DNNFusion chooses this greedy scheme to keep the optimization overheads low.

Step I: Fusion seed operator(s) selection. DNNFusion selects the One-to-One operator with the minimum intermediate result as the fusion seed operator (as shown in Listing 1 lines 1 to 5). This heuristic is used because a smaller intermediate result makes fusion more profitable. This may seem counter-intuitive because fusing the operators with larger intermediate results usually results in more benefits.

TABLE 4

Graph rewriting with mathematical properties. Only representative graph rewriting rules are listed due to space limitation. In summary, DNNFusion derives 45, 38, and 66 graph rewriting rules in the category of Associative, Distributive, and Communicative, respectively. We omit unrelated operators for better readability. ⊙, +, −, Abs, Recip, Square, √ mean element-wise multiplication, addition, subtraction, absolute, reciprocal, square, and square root, respectively. BitShift calculates the bit shifted value of elements of a given tensor element-wisely. ReduceSum and ReduceProd calculate the reduced summation and production of elements of an input tensor along an axis. Exp calculates the exponent of elements in a given input tensor element-wisely. #FLOPS denotes the number of floating point operations

| | Without graph rewriting | | With graph rewriting | |
|---|---|---|---|---|
| Property | Graph structure in equation | #FLOPS | Graph structure in equation | #FLOPS |
| Associative | Recip(A) ⊙ Recip(A ⊙ B) | 4 * m * n | Square(Recip(A)) ⊙ B | 3 * m * n |
| | (A ⊙ √B) ⊙ (√B ⊙ C) | 5 * m * n | A ⊙ B ⊙ C | 2 * m * n |
| | Abs(A) ⊙ B ⊙ Abs(C) † | 4 * m * n | Abs(A ⊙ C) ⊙ B | 3 * m* n |
| | (A ⊙ ReduceSum(B)) ⊙ (ReduceSum(B) ⊙ C)¶ | 5 * m * n | A ⊙ Square(ReduceSum(B)) ⊙ C | 3 * m * n + m |
| Distributive | A ⊙ C + A ⊙ B | 3 * m * n | (A + B) ⊙ C | 2 * m * n |
| | A + A ⊙ B | 2 * m * n | A ⊙ (B + 1) | 2 * m * n § |
| | Square(A + B) − (A + B) ⊙ C | 5 * m * n | (A + B) ⊙ (A + B − C) | 3 * m * n |
| Commutative | A ⊙ B | m * n | B ⊙ A | m * n‡ |
| | ReduceSum(BitShift(A)) ¶ | 2 * m * n | BitShift(ReduceSum(A)) | m * n + m |
| | ReduceProd(Exp(A)) ¶ | 2 * m * n | Exp(ReduceSum(A)) | m * n + m |

§ Although #FLOPS is not reduced, A is loaded once instead of twice.
† First use commutative property to swap B and Abs (C), then apply associative property.
‡ Even though this pattern has no #FLOPS gains, it can enable further optimization, e.g the case of †.
¶ #FLOPS is calculated by assuming the reduction of ReduceSum/ReduceProd is along with the inner-most dimension.

2.3 Light-Weight Profile-Driven Fusion Plan Exploration 2.3.1 Overall Idea. Optimal fusion plan generation requires a large search space and has been shown to be NP-complete. To keep the process at manageable costs, DNNFusion explores fusion plans by employing a new light-weight (greedy) approach based on our proposed Extended Computational Graph (ECG) IR and our classification of operations into mapping types.

The high-level ideas are as follows. First, DNNFusion selects the starting operators (called fusion seed operators) from our ECG to restrict the search space. This is based on a key insight that operators of One-to-One mapping type have the potential to yield more benefits because they a) potentially result in fusion of more layers, including both with their predecessors and successors because of what we refer to as lower transformation impedance, and b) have lower memory requirements and need for fewer registers among all mapping types. Second, starting with these seed operators, DNNFusion explores fusion opportunities along the seed operator's successors and predecessors, respectively. Third, DNNFusion creates fusion plans based on an approach that combines machine-independent mapping type analysis and a profiling result database. The mapping type analysis follows Table 3 to check the operators' mapping type combination (in ECG) to decide if these operators should be fused. Such mapping eliminates unnecessary profile data lookup for most cases.

Figure 3:
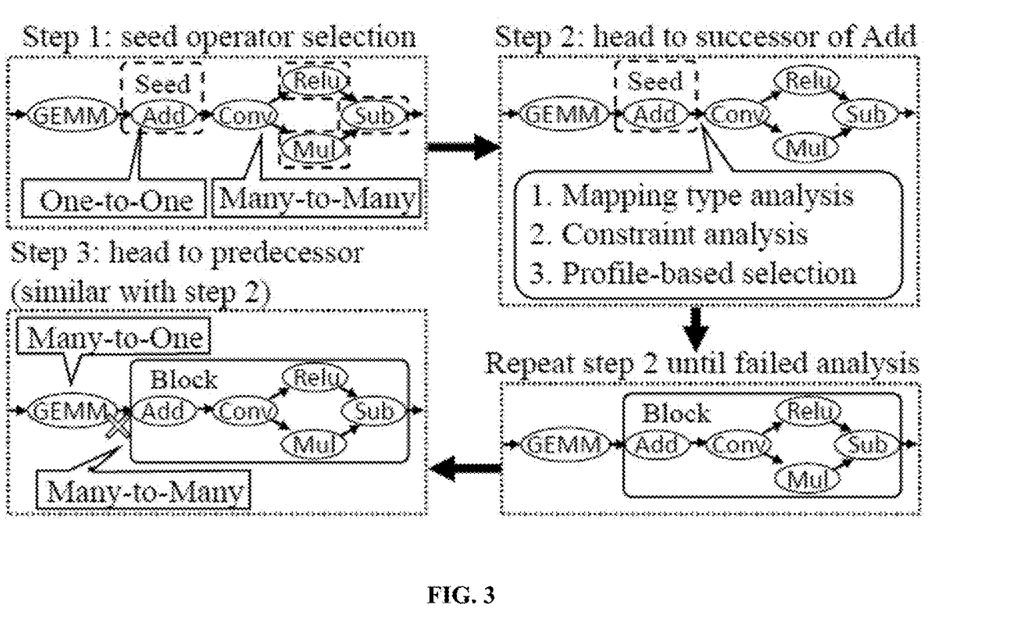
FIG. 3 illustrates an example of fusion plan exploration according to one aspect of the present disclosure.

2.3.2 Fusion Plan Generation Methodology. Listing 1 shows a detailed fusion plan exploration method according to one aspect of the present disclosure. Its goal is to generate candidate fusion blocks that are further optimized by subsequent intra-block optimizations (Section 2.4) before fusion code generation. FIG. 3 illustrates its basic idea with a simplified example. This method consists of three main steps:

However, DNNFusion has a different goal, i.e., to ultimately enable more fusions to occur. Starting with a pair of operators with smaller intermediate results creates opportunities to fuse more (smaller) operators together, increase overall computation granularity, and hence enable higher parallelism and better load balance for the entire DNN computation. If multiple seed operators with the same minimum size of intermediate results exist, DNNFusion initiates fusion with them one after another (unless another seed is grouped to the same candidate fusion block). In FIG. 3, Add, Relu, Mul, and Sub are in One-to-One type (with an identical intermediate result size), then Add is selected as the seed for the first round of fusion plan exploration.

Listing 1. Fusion plan generation

```
1    def generate_seed(ops):
2        # find all one_to_one mapping operators
3        oto_ops = find_all_one_to_one(ops)
4        # find the operator with minimum IRS size
5        return min(op.IRS_size for op in oto_ops)
6
7    def fuse_successor(op, successor, block):
8        # Step 2.1: check the mapping relationship
9        relation = mapping_check(op, successor)
10       # return if successor can not be fused
11       if relation == fuse_break: return
12       # Step 2.2: check the constraint requirement
13       if not check_constraint(op, successor, block):
14           return
15       # fuse by profile-based selection
16       if relation == fuse_depend:
17           # Step 2.3: get latency w/ database/runtime
18           temp_latency = latency(block + successor)
19           if temp_latency > latency(block, successor):
20               return
21       block = op + successor
```

Listing 1. Fusion plan generation

```
22          # Step 2.4: recursively head to successor
23          for fusing_op in successors(successor):
24              fuse_successor(successor, fusing_op, block)
25
26      # Similar with fuse_successor
27      def fuse_predecessor(op, predecessor, block):
28          # Similar with step 2.1, 2.2, 2.3, 2.4
29
30      # <Algorithm Entry>
31      unfused_ops = all_operators
32      # Step 1: start fuse from the selected seed
33      while(sp = generate_seed(unfused_ops)):
34          block = [sp]
35          # Step 2: head to successor
36          for successor in successors(sp):
37              fuse_successor(sp, successor, block)
38          # Step 3: head to predecessor
39          for predecessor in predecessors(sp):
40              fuse_predecessor(sp, predecessor, block)
41          unfused_ops = unfused_ops – block
```

Step II: Propagated exploration along seed operator's successors. Each operator may have one or multiple immediate predecessors and successors. DNNFusion first processes the seed operator's successors one by one (Listing 1 Lines 7 to 24). At any stage in this recursive exploration, if a node cannot be fused with any of its immediate successors, fusion is not considered any further. Broadly, this step proceeds as follows. First, mapping type analysis (Listing 1 Step 2.1) categorizes the potential fusion result into three types based on Table 3: 1) fuse_break indicates this is a Red group case, and fusion should be aborted; 2) fuse through indicates that this is a Green group case, and should be proceeded without any further analysis; 3) fuse_depend indicates that this is a Yellow group case, requiring a profile data lookup. Second, a constraints check (Listing 1 Step 2.2) is applied to analyze if further fusion is likely undesirable, i.e, it incurs too many overheads (e.g., can cause excessive register spills). Using an empirically determined threshold, the DNNFusion can decide to not consider any additional fusion candidates. Otherwise, DNNFusion continues exploring fusion candidates recursively. FIG. 3 shows an example of fusing Add with Conv and other operators with this step. After this step, the generated candidate fusion block has a mapping type of Many-to-One, and includes five operators (Add, Conv, Relu, Mul, and Sub).

Step III: Propagated exploration along seed's predecessors. After processing along the seed's successor direction, DNNFusion processes along the seed's predecessors direction with the same algorithm as Step II (In fact, Step III and Step II can be swapped). However, one difference is that if an operator has multiple immediate predecessors, there is an option of fusing with some, but not all, of these immediate predecessors. In the example in FIG. 3, the first attempt of fusing current candidate fusion block with GEMM fails because both of them are of many-to-many mapping type. Table 3 indicates this is a fuse_break case, so GEMM is not included in this candidate fusion block.

Iterate. DNNFusion completes a round of fusion plan generation with above steps. If more fusion seeds exist, it will iterate from Step II with the next seed until no additional fusion seed is available.

2.4 Fusion Code Generation and Optimizations 2.4.1 Fusion Code Generation. Once fusion blocks have been selected by our algorithm, DNNFusion generates fused code for each fusion block with a data-flow tree (DFT) built from the Extended computational Graph (ECG) and a set of pre-defined code generation rules. DNNFusion generates C++ code for mobile CPU and OpenCL for mobile GPU, respectively. More specifically, DNNFusion traverses DFT and generates fused code for each pair of operators to be fused by leveraging the code generation rules that are based on abstract mapping types (e.g., One-to-One). 23 code generation rules are defined for each of mobile CPU and mobile GPU, with one rule corresponding to a green group cell or yellow group cell in Table 3. The basic idea is that as long as the operators are of the same type, the same rules lead to efficient code. While fusing more than two operators, these rules are invoked each time two operators are fused. Finally, the subsequent code optimizations (e.g, vectorization, unrolling, tiling, and memory/register optimizations, and auto-tuning of these optimizations) can be handled by an existing framework called Pattern-based Deep Neural Network ("PatDNN") or any other similar frameworks.

In the case of using PatDNN, it involves identifying and analyzing the patterns learned by the DNN during the training process to understand how it arrives at its predictions. The approach focuses on extracting meaningful patterns and features from the input data and using them to interpret the model's behavior. For more details, please refer to [reference article/application #].

Note that during the iterative fusion generation process, almost each fusion generates a new operator (and its codes) that is not present in the original operator library; however, once the new operator (and its code) is generated, it can be used for both the current model and future models.

Figure 4:
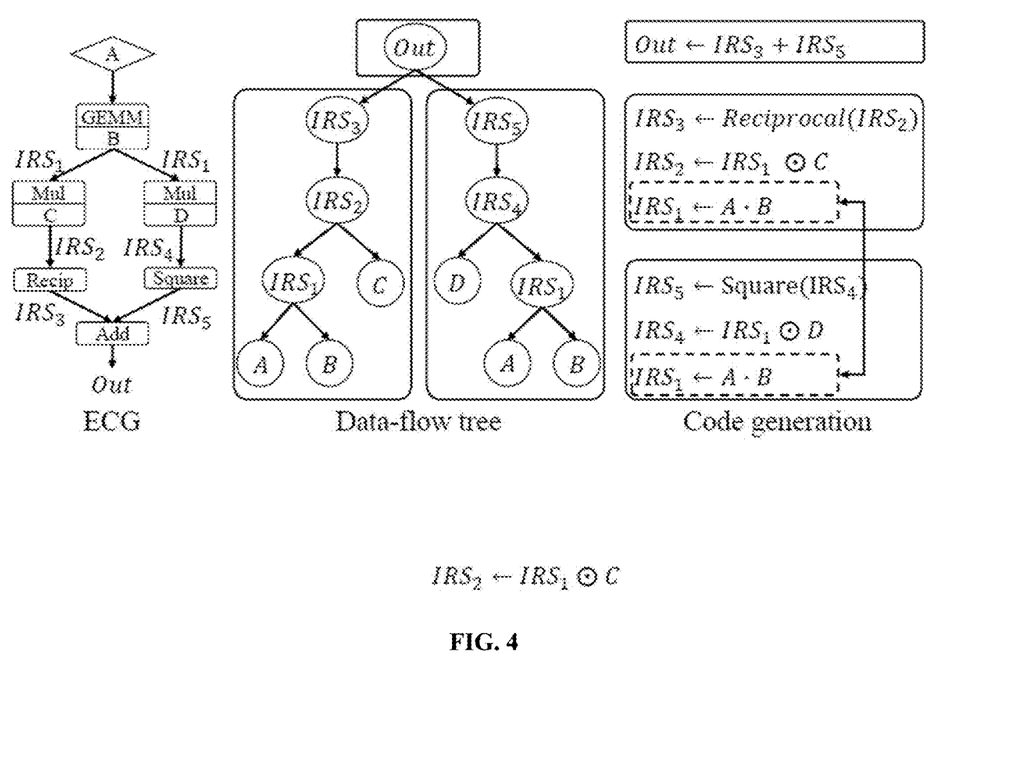
FIG. 4 illustrates an example of the code generation according to one aspect of the present disclosure.

FIG. 4 shows an example of the code generation. To elaborate, DNNFusion first generates a data-flow tree (DFT) from the Extended Computational Graph (ECG). This DFT represents the final output (Out), all intermediate results (IRS), and all inputs (A, B, C, and D) with the edges reversed as compared to the ECG (i.e., the parent node depends on the children nodes). During the fused code generation, DNNFusion traverses this DFT to recognize the input/output data dependence (and fuses corresponding ECG operations), recursively. The right-hand side of FIG. 4, shows an example of this DFT traversal (the fused code generation based on the pre-defined code generation rules is omitted in this Figure for readability and is introduced in the next paragraph). First, DNNFusion recognizes that Out depends on $IRS_3+IRS_5$; next, it recognizes that $IRS_3$ depends on reciprocal of $IRS_2$, and so on, until reaching the input of A, B, C, D. It is worth noting DNNFusion can also find redundant computations in DFT with a common sub-tree identification and eliminate them during code generation. In our example, both Mul operators use $IRS_1$, resulting in a common sub-tree in DFT, so the recognition of $IRS_1 \leftarrow$ A·B in the two dash-lined boxes of FIG. 4 is only taken once.

During this DFT traversal, DNNFusion employs the pre-defined code generation rules to generate the code for each pair of operators to be fused. For the example shown in FIG. 4, DNNFusion first fuses Add with its left input branch Recip. Both Add and Recip belong to One-to-One mapping, and hence the fused operator is also One-to-One. DNNFusion keeps fusing Mul (One-to-One) with this newly fused operator, and the result is still One-to-One. Next, this newly generated operator is fused with GEMM (Many-to-One), generating a new Many-to-One operator. Similar steps are taken along the right input branch of Add until all operators are fused into a single new Many-to-One operator. DNNFusion relies on the DFT traversal introduced in the prior paragraph to figure out the input/output data dependence, and employs the operator mapping type to handle the index mapping relationship and generate proper nested loop structures.

To explain this further, here is an example with more complicated mapping types: GEMM (Many-to-Many)+Div (One-to-One)+Transpose (Shuffle). First, DNNFusion fuses Transpose and Div, a case of ("Shuffle+One-to-One") by first permuting the loop in the Transpose operator and then fusing it with the Div operator. It generates a new operator of the type Shuffle. Next, DNNFusion fuses GEMM (Many-to-Many type) with this new operator (Shuffle type), in which DNNFusion maps output elements of GEMM to the destination that is decided by this new operator.

2.4.2 Other Fusion-related Optimizations. DNNFusion also includes several advanced optimizations enabled by our fusion analysis and fused code generation. They broadly can be characterized into two groups, intra-fusion-block optimizations that are performed on Extended Computational Graph (ECG) immediately before the code generation and inter-fusion-block optimizations on the generated fused code.

Figure 5:
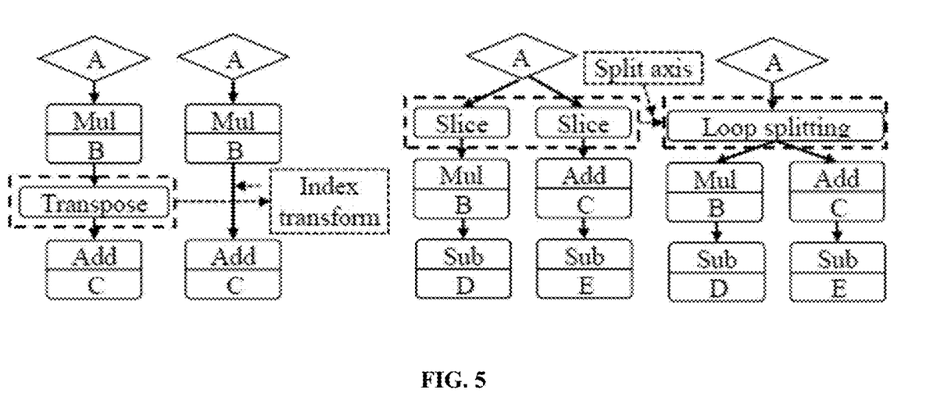
FIG. 5 illustrates examples of operators optimization to reduce intermediate results overheads according to one aspect of the present disclosure.

Intra-block Optimizations: Operators in Shuffle and Reorganize mapping types usually involve intensive data movement. We observed many of these time/memory consuming data operations can be eliminated. In particular, consider the case when the transformed data is used by only one subsequent operator because the data locality improvement brought this data transformation cannot be compensated by the overhead of intermediate results generation and storage. FIG. 5 shows such examples—particularly, in these, data transpose and data slicing operations bring more overheads than the benefit. Thus, in such cases, DNNFusion replaces them with operations that have a changed data index. These optimizations are performed after graph rewriting and result in an ECG that should have a more efficient implementation.

Inter-block Optimization: Different operators prefer different data formats. Without the proposed graph rewriting optimizations and operator fusion, normally such choices are made at the level of each individual operator—however, this can result in redundant or unnecessary transformations. In contrast, DNNFusion considers the data format choice at a global level, thus avoiding redundant or unnecessary transformations. Currently, DNNFusion employs a heuristic approach to optimize the data format, which is as follows. For a specific fusion block, it identifies one dominant operator whose performance is impacted the most by the choice of the layout (e.g., CONV, GEMM, and Softmax are most likely to such operators). The optimal layout for this operation is then used for the entire fusion block. This heuristic approach works based on a key observation that most other non-dominant operators can employ any layout/format without their performance being significantly affected. A potential future work will be to consider more sophisticated cost models, including balancing the cost of reformatting the data with reductions in execution because of the optimized layout.

TABLE 5

Fusion rate evaluation: computation layer count and intermediate result size for all evaluated DNNs. CIL (Compute-Intensive Layer): each input is used more than once, e.g. MatMul, CONV. MIL (Memory-Intensive Layer): each input is used only once, e.g. Activation. IRS: intermediate results. '—' means this framework does not support this model.

| | | | Layer counts and IRS sizes before opt. | | | |
|---|---|---|---|---|---|---|
| Model | Type | Task | #CIL | #MIL | #Total layer | IRS size |
| EfficientNet-B0 | 2D CNN | Image classification | 82 | 227 | 309 | 108 MB |
| VGG-16 | 2D CNN | Image classification | 16 | 35 | 51 | 161 MB |
| MobileNetV1-SSD | 2D CNN | Object detection | 16 | 48 | 202 | 110 MB |
| YOLO-V4 | 2D CNN | Object detection | 106 | 292 | 398 | 329 MB |
| C3D | 3D CNN | Action recognition | 11 | 16 | 27 | 195 MB |
| S3D | 3D CNN | Action recognition | 77 | 195 | 272 | 996 MB |
| U-Net | 2D CNN | Image segmentation | 44 | 248 | 292 | 312 MB |
| Faster R-CNN | R-CNN | Image segmentation | 177 | 3,463 | 3,640 | 914 MB |
| Mask R-CNN | R-CNN | Image segmentation | 187 | 3,812 | 3,999 | 1,524 MB |
| TinyBERT | Transformer | NLP | 37 | 329 | 366 | 183 MB |
| DistilBERT | Transformer | NLP | 55 | 402 | 457 | 540 MB |
| ALBERT | Transformer | NLP | 98 | 838 | 936 | 1,260 MB |
| $BERT_{BASE}$ | Transformer | NLP | 109 | 867 | 976 | 915 MB |
| MobileBERT | Transformer | NLP | 434 | 1,953 | 2,387 | 744 MB |
| GPT-2 | Transformer | NLP | 84 | 2,449 | 2,533 | 1,389 MB |

| | Layer counts and IRS sizes after opt. | | | | | |
|---|---|---|---|---|---|---|
| Model | MNN | TVM | TFLite | Pytorch | DNNF | IRS size |
| EfficientNet-B0 | 199 | 195 | 201 | 210 | 97 | 26 MB |
| VGG-16 | 22 | 22 | 22 | 22 | 17 | 52 MB |
| MobileNetV1-SSD | 138 | 124 | 138 | 148 | 71 | 37 MB |
| YOLO-V4 | 198 | 192 | 198 | 232 | 135 | 205 MB |
| C3D | 27 | 27 | — | 27 | 16 | 90 MB |
| S3D | — | — | — | 272 | 98 | 356 MB |
| U-Net | 241 | 232 | 234 | — | 82 | 158 MB |
| Faster R-CNN | — | — | — | — | 942 | 374 MB |
| Mask R-CNN | — | — | — | — | 981 | 543 MB |
| TinyBERT | — | 304† | 322 | — | 74 | 55 MB |
| DistilBERT | — | 416† | 431 | — | 109 | 197 MB |
| ALBERT | — | 746† | 855 | — | 225 | 320 MB |
| $BERT_{BASE}$ | — | 760† | 873 | — | 216 | 196 MB |

TABLE 5-continued

Fusion rate evaluation: computation layer count and intermediate result size for all evaluated DNNs. CIL (Compute-Intensive Layer): each input is used more than once, e.g. MatMul, CONV. MIL (Memory-Intensive Layer): each input is used only once, e.g. Activation. IRS: intermediate results. '—' means this framework does not support this model.

| | | | | | | |
|---|---|---|---|---|---|---|
| MobileBERT | — | 1,678[†] | 2,128 | — | 510 | 255 MB |
| GPT-2 | — | 2,047[†] | 2,223 | — | 254 | 356 MB |

[†]TVM does not support this model on mobile. This layer count number is collected on a laptop platform for reference.

3. Evaluation

DNNFusion is implemented on top of an existing end-to-end DNN execution framework called PatDNN that supports both dense and sparse DNN execution. It has been shown in our previous work that PatDNN performs slightly better than TVM, MNN, and TFLITE even without our proposed operator fusion. For readability, we also call this optimized framework DNNFusion. Our evaluation has four objectives: 1) demonstrate that the proposed fusion framework (together with graph rewriting) is effective by showing how DNNFusion outperforms other state-of-the-art frameworks, and no-fusion and fixed-pattern fusion implementations on various DNN models; 2) validating DNNFusion's generality by showing its efficient execution on both CPU and GPU on a wide spectrum of DNNs (for 5 types of tasks, with varied sizes, and layer counts ranging from relatively shallow to extremely deep); 3) analyzing the impact of different compiler optimizations on both execution time and compilation time; and 4) demonstrating the effective portability of DNN-Fusion by evaluating it on three different mobile phones.

More specifically, DNNFusion (also called DNNF for short) is compared against four popular state-of-the-art end-to-end DNN execution frameworks: MNN, TVM, TensorFlow-Lite (TFLite), and Pytorch-Mobile (Pytorch). Because certain extremely deep neural networks are not supported by any of these existing frameworks (or just supported by their mobile CPU implementation), we also set a baseline by turning off DNNFusion's all fusion related optimizations (called OurB, i.e., our baseline version without fusion) and implement a version that optimizes OurB with fixed-pattern fusion (using operator fusion described in TVM (called OurB+), and compare DNNFusion against them.

TABLE 6

Inference latency comparison: DNNFusion, MNN, TVM, TFlite, and PyTorch on mobile CPU and GPU. #FLOPS denotes the number of floating point operations. OurB is our baseline implementation by turning off all fusion optimizations and OurB+ is OurB with a fixed-pattern fusion as TVM. DNNF is short for DNNFusion, i.e., our optimized version. '—' denotes this framework does not support this execution.

| Model | #Params | #FLOPS | MNN (ms) | | TVM (ms) | | TFLite (ms) | | Pytorch (ms) | |
|---|---|---|---|---|---|---|---|---|---|---|
| | | | CPU | GPU | CPU | GPU | CPU | GPU | CPU | GPU |
| EfficientNet-B0 | 5.3M | 0.8 B | 41 | 26 | 56 | 27 | 52 | 30 | 76 | — |
| VGG-16 | 138M | 31.0 B | 242 | 109 | 260 | 127 | 245 | 102 | 273 | — |
| MobileNetV1-SSD | 9.5M | 3.0 B | 67 | 43 | 74 | 52 | 87 | 68 | 92 | — |
| YOLO-V4 | 64M | 34.6 B | 501 | 290 | 549 | 350 | 560 | 288 | 872 | — |
| C3D | 78M | 77.0 B | 867 | — | 1,487 | — | — | — | 2,541 | — |
| S3D | 8.0M | 79.6 B | — | — | — | — | — | — | 6,612 | — |
| U-Net | 2.1M | 15.0 B | 181 | 106 | 210 | 120 | 302 | 117 | 271 | — |
| Faster R-CNN | 41M | 47.0 B | — | — | — | — | — | — | — | — |
| Mask R-CNN | 44M | 184 B | — | — | — | — | — | — | — | — |
| TinyBERT | 15M | 4.1 B | — | — | — | — | 97 | — | — | — |
| DistilBERT | 66M | 35.5 B | — | — | — | — | 510 | — | — | — |
| ALBERT | 83M | 65.7 B | — | — | — | — | 974 | — | — | — |
| $BERT_{Base}$ | 108M | 67.3 B | — | — | — | — | 985 | — | — | — |
| MobileBERT | 25M | 17.6 B | — | — | — | — | 342 | — | — | — |
| GPT-2 | 125M | 69.1 B | — | — | — | — | 1,102 | — | — | — |

| | OurB (ms) | | OurB+ (ms) | | DNNF (ms) | |
|---|---|---|---|---|---|---|
| Model | CPU | GPU | CPU | GPU | CPU | GPU |
| EfficientNet-B0 | 54 | 35 | 38 | 24 | 16 | 10 |
| VGG-16 | 251 | 121 | 231 | 97 | 171 | 65 |
| MobileNetV1-SSD | 79 | 56 | 61 | 39 | 33 | 17 |
| YOLO-V4 | 633 | 390 | 426 | 257 | 235 | 117 |
| C3D | 880 | 551 | 802 | 488 | 582 | 301 |
| S3D | 1,409 | 972 | 1,279 | 705 | 710 | 324 |
| U-Net | 227 | 142 | 168 | 92 | 99 | 52 |
| Faster R-CNN | 2,325 | 3,054 | 1,462 | 1,974 | 862 | 531 |
| Mask R-CNN | 5,539 | 6,483 | 3,907 | 4,768 | 2,471 | 1,680 |
| TinyBERT | 114 | 89 | 92 | 65 | 51 | 30 |
| DistilBERT | 573 | 504 | 467 | 457 | 224 | 148 |
| ALBERT | 1,033 | 1,178 | 923 | 973 | 386 | 312 |
| $BERT_{Base}$ | 1,086 | 1,204 | 948 | 1,012 | 394 | 293 |
| MobileBERT | 448 | 563 | 326 | 397 | 170 | 102 |
| GPT-2 | 1,350 | 1,467 | 990 | 1,106 | 394 | 292 |

3.1 Evaluation Setup

Models and datasets. DNNFusion is evaluated on 15 mainstream DNN models. Table 86 characterizes them with a comparison of their targeted task, number of parameters, total number of layers, and number of floating point operations (FLOPS). Particularly, we have 1) two image classification 2D CNNs (EfficientNet-B0 and VGG-16), 2) two object detection two-dimensional (2D) CNNs (MobileNetV1-SSD and YOLO-V4), 3) two action recognition three-dimensional (3D) CNNs (C3D and S3D), 4) one image segmentation 2D CNN (U-Net) and two image segmentation R-CNNs (Mask R-CNN and FasterRCNN), and 5) six natural language processing (NLP) models (TinyBERT, DistilBERT, ALBERT, BERTBASE, MobileBERT, and GPT-2).

Because the choice of datasets has a negligible impact on the final inference latency or relative execution speeds (and also because of space limitations), we report results from one dataset for each model. EfficientNet-B0 and VGG-16 are trained on ImageNet dataset; MobileNetV1-SSD and YOLO-V4 are trained on MS COCO; C3D and S3D are trained on UCF-101; U-Net, Faster R-CNN, and Mask R-CNN are trained on PASCAL VOC 2007 TinyBERT, DistilBERT, ALBERT, BERTbase, MobileBERT, and GPT-2 are trained on BooksCorpus and English Wikipedia. Because the model accuracy is identical among all frameworks, and also because of space limitations, we only focus on execution times and do not report accuracy.

Evaluation environment. The evaluations are carried out on a Samsung Galaxy S20 cell phone that has Snapdragon 865 processor, which comprises an octa-cores Kryo 585 CPU and Qualcomm Adreno 650 GPU yielding high performance with good power efficiency. For demonstrating portability, we further use a Samsung Galaxy S10 with a Snapdragon 855 (Qualcomm Kryo 485 Octa-core CPU and a Qualcomm Adreno 640 GPU), and an Honor Magic 2 with a Kirin 980 (ARM Octa-core CPU and a Mali-G76 GPU). All executions used 8 threads on mobile CPUs, and similarly all pipelines on mobile GPUs. 16-bit and 32-bit floating points are used for all GPU runs and CPU runs, respectively. All experiments were run 100 times but as the variance was very small, we only report averages.

3.2 Overall Mobile Inference Evaluation

Our comparison includes both fusion rate and execution latency.

Fusion rate. Table 5 shows detailed layer counts (including computation-intensive (CIL), memory-intensive (MIL), and all layers), and intermediate result sizes for models before fusion and after fusion with different frameworks. Note that DNNFusion is the only end-to-end framework that can support all of the target models on both mobile CPU and mobile GPU. In Table 5, "-" implies that this framework does not support this model. Certain extremely deep neural networks (e.g., Faster R-CNN and Masker R-CNN) are not supported by any other frameworks on mobile devices because these frameworks either lack the support of multiple key operators and/or limited optimization supported in them lead to a large model execution footprint. For transformer-based models, only TFLite can support execution on mobile CPU (without GPU support).

Table 5 shows that compared with the other frameworks, DNNFusion results in better fusion rates, with 1.3× to 2.9×, 1.3× to 8.1×, 1.3× to 8.8×, and 1.3× to 2.8× over MNN, TVM, TFLite, and Pytorch, respectively. Particularly, compared with original models, DNNFusion yields more benefits for R-CNN and Transformer-based models (3.9× to 1.0× fusion rate) than 2D/3D CNNs (1.7× to 3.6× fusion rate). This is because 2D/3D CNNs have higher fractions of computation-intensive layers that are in either One-to-Many or Many-to-Many types, while transformer-based models have more memory-intensive layers that are in One-to-One, Shuffle, or Reorganize categories. The latter offers more fusion opportunities according to our mapping type analysis (Table 3). Because of the same reason, 3D CNNs have the lowest fusion rate because they are more compute-intensive. Moreover, comparing to TVM (that performs the best among all other frameworks), DNNFusion particularly yields more benefits for transformer-based models. This is because these models have more types of operators, and TVM's fixed pattern-based fusion cannot capture fusion opportunities among many types of operators while DNNFusion can. This result demonstrates that DNNFusion has a better generality.

Execution latency. Table 6 shows the execution latency evaluation results. Comparing with MNN, TVM, TFLite, and Pytorch, with fusion optimization, DNNFusion achieves the speedup of 1.4× to 2.6×, 1.5× to 3.5×, 1.4× to 3.3×, and 1.6× to 9.3×, respectively, on the mobile CPU. Focusing on mobile GPU, improvements over MNN, TVM, and TFLite are 1.7× to 2.6×, 2.0× to 3.1×, 1.6× to 4.0×, respectively, whereas Pytorch does not support execution on this mobile GPU. The reason for speedups including the fact that our baseline implementation with a fixed-pattern fusion (OurB+) is already faster than other frameworks (with speedup of 1.04× to 5.2× on mobile CPU and 1.05× to 1.7× on mobile GPU), and with our more advanced fusion, DNNFusion achieves 1.4× to 2.5× speedup over OurB+ on mobile CPU and 1.5× to 3.9× speedup on mobile GPU. In addition, comparing DNNFusion (with fusion) and our baseline without fusion (OurB), our advanced fusion brings 1.5× to 5.8× speedup. Moreover, fusion optimization offered by DNNFusion brings more benefits for mobile GPU than CPU, particularly for extremely deep models (e.g., Faster R-CNN and GPT-2). This is because mobile GPU offers more parallelism but smaller cache capacity compared to CPU, and GPU kernel launch incurs certain overheads, so it is more sensitive to intermediate data reduction, kernel launch reduction, and processor utilization increase that are brought by DNNFusion's fusion.

Figure 6:
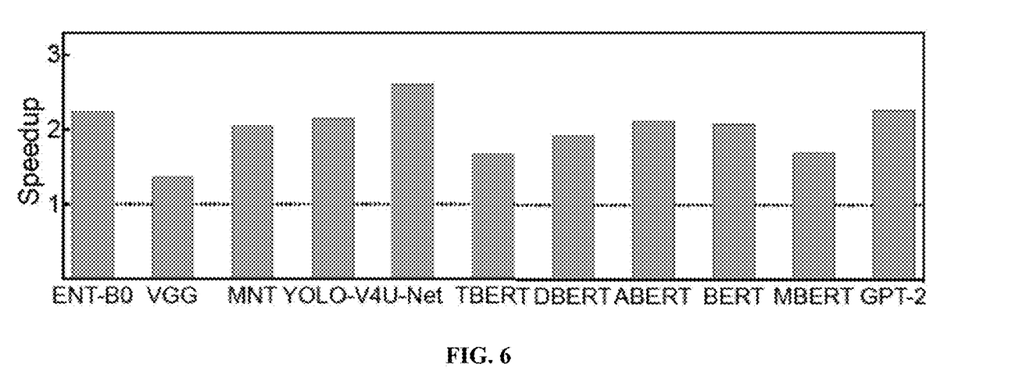
FIG. 6 compares DNNFusion's performance with a state-of-the-art computational graph substitution approach called TASO.

To further validate DNNFusion's performance, FIG. 6 compares it with a state-of-the-art computational graph substitution approach mentioned earlier, TASO. We use TASO to optimize all eleven models (computational graphs) supported by TFLite among those listed in Table 6, including EfficientNet-B0 (ENT-B0), VGG-16 (VGG), MobileNetV1-SSD (MNT), YOLO-V4, U-Net, TinyBERT (TBERT), DistilBERT (DBERT), ALBERT (ABERT), BERTBase (BERT), MobileBERT (MBT), and GPT-2. Then, for our experiments, these models are executed under TFLite on mobile CPU (not GPU because TFLite lacks GPU support for many of these models). Compared with TASO (shown in FIG. 6 as dotted horizontal line representing the normalized baseline performance of TASO), DNNFusion yields 1.4× to 2.6× speedup on mobile CPU. The graph rewriting in DNNFusion is designed to work in conjunction with operator fusion and identifies a set of operators and rules for that specific purpose, thus enabling more fusion opportunities. TASO does not emphasize the relationship between graph rewriting and fusion, resulting in less efficient execution as compared to DNNFusion.

3.3 Understanding Fusion Optimizations

This section studies the effect of our key optimizations.

Figure 7:
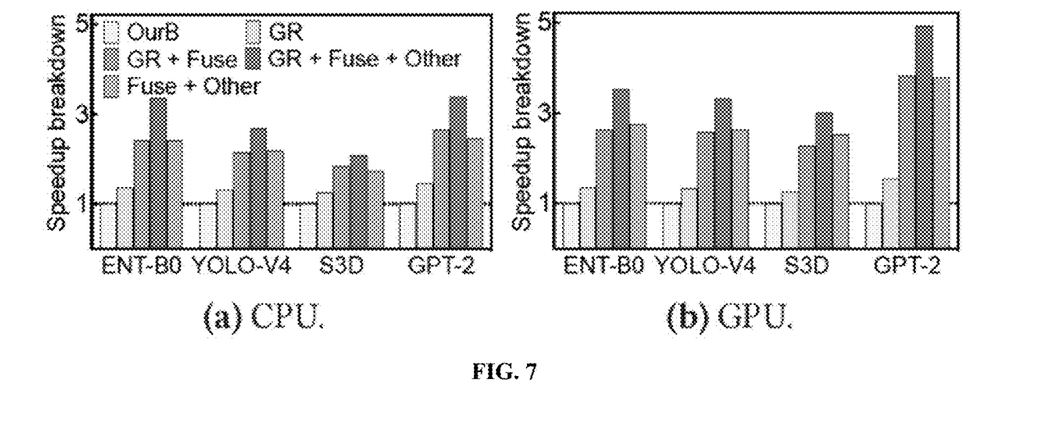
FIG. 7 illustrates the impact of our proposed optimizations on latency with four models (EfficientNet-B0 (ENT-B0), YOLO-V4, S3D, and GPT-2) on both mobile CPU and GPU.

Optimization breakdown. FIG. 7 shows the impact of our proposed optimizations on latency with four models (EfficientNet-B0 (ENT-B0), YOLO-V4, S3D, and GPT-2) on both mobile CPU and GPU. Experiments on other models show a similar trend and are omitted due to space constraints. We evaluate each compiler-based optimization speedup incrementally over the OurB version. Compared with OurB, graph rewriting brings 1.2× to 1.5× speedup, fusion brings additional 1.6× to 2.2× speedup, and other optimizations (intra-block optimizations like data movement operator optimizations and inter-block optimizations like data format optimizations introduced in Section 2.4.2) bring additional 1.3× to 1.8× speedup on mobile CPU. On mobile GPU, these numbers are 1.3× to 1.5×, 2.1× to 3.3×, and 1.7× to 2.1×, respectively. Again, our fusion brings more benefit for mobile GPU than CPU due to the aforementioned reasons of memory, parallelism, and kernel launch overheads. Although graph rewriting by itself brings fewer benefits than the fusion, its hidden benefit is in enabling more fusion opportunities. Take GPT-2 as an example—without graph rewriting, the generated fused layer count is 310, while after rewriting, it is 254 (18% reduction). This is because graph rewriting simplified the computational graph structure. To further assess this impact of graph rewriting on operator fusion, the last bar (in orange) of FIG. 7 reports the speedup of fusion with other optimizations only (i.e., without graph rewriting) over the baseline OurB. Compared with no graph rewriting, graph rewriting brings an additional 1.4× to 1.9× and 1.6× to 2.0× speedup (over OurB) on mobile CPU and GPU, respectively.

Figure 8:
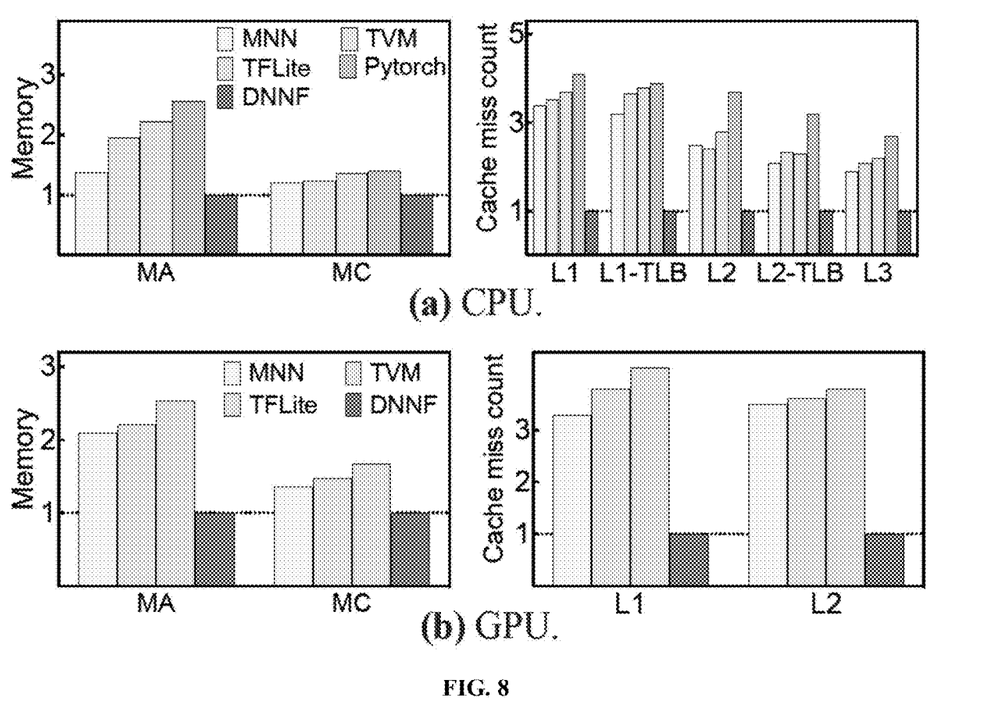
FIG. 8 illustrates cache miss count on data cache and TLB cache on mobile CPU and similar results on mobile GPU.

Memory and cache performance We compare memory (and cache) performance of DNNFusion with other frameworks on both mobile CPU and GPU. We only report YOLO-V4's results due to space constraint, and because it is one of the models supported by all frameworks. FIG. 8 (a) left shows memory performance (measured in total memory accesses (MA) and memory consumption (MC))—MA and MC are collected from Snapdragon Profiler, and FIG. 8 (a) right shows cache miss count on data cache and TLB cache on mobile CPU. All values are normalized with respect to DNNFusion (i.e., our best version) for readability. DNNFusion outperforms other frameworks on both memory access count and memory consumption because it eliminates materialization of more intermediate results. FIG. 8 (b) shows similar results on mobile GPU (excluding PyTorch because it does not support YOLO-V4 on mobile GPU). Mobile GPU results are generally better than CPU because mobile GPU has smaller cache capacity and simpler hierarchy (GPU only has L1/L2 v.s., CPU has L1/L2/L3). Thus, intermediate results reduction leads to more gains on mobile GPU.

Figure 9:
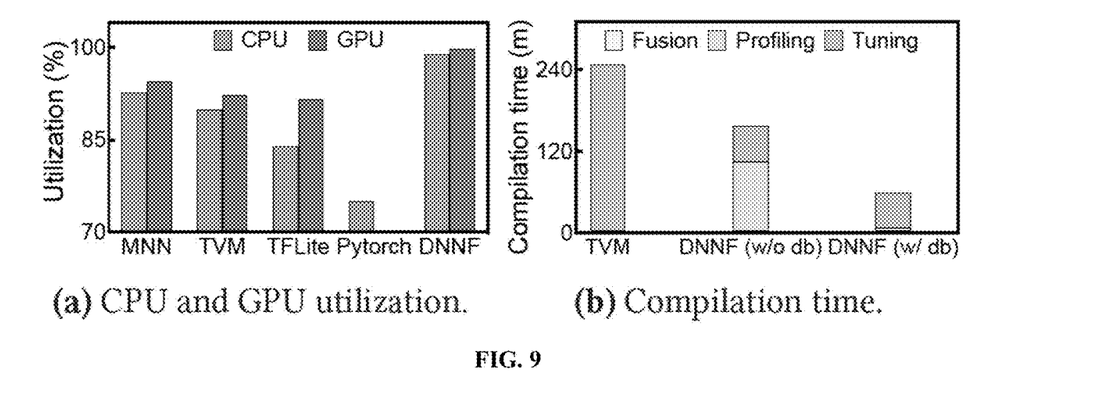
FIG. 9 reports the mobile CPU and GPU utilization on YOLO-V4, and compares the compilation time between TVM and DNNFusion for YOLO-V4 on mobile CPU.

CPU/GPU utilization. FIG. 9 (a) reports the mobile CPU and GPU utilization on YOLO-V4. This result is collected by Snapdragon Profiler. It shows that DNNFusion results in the highest utilization on both CPU and GPU because its aggressive fusion groups more computation together, resulting in coarser-grained execution with less loop and parallel scheduling (and kernel launch for GPU only) overhead. Particularly, the GPU utilization is slightly higher than CPU because of its higher parallelism.

Compilation time. FIG. 9 (b) compares the compilation time between TVM and DNNFusion for YOLO-V4 on mobile CPU. TVM's compilation time consists of operator fusion and other compiler optimizations (Fusion), and tuning for performance-critical parameters, e.g., tiling size, unrolling factors, and others (Tuning). Tuning dominates its compilation time, lasting for around 4 hours for YOLO-V4 on mobile CPU. DNNFusion's compilation time consists of operator fusion and other compiler optimizations (Fusion), profiling to analyze the fusion benefits (Profiling), and performance tuning (Tuning). DNNFusion's Tuning relies on an auto-tuner based on Genetic Algorithm (reported in our previous publication) to generate the exploration space. Compared with AutoTVM, our auto-tuning's Genetic Algorithm allows parameter search to start with initializing an arbitrary number of chromosomes. Without our pre-existing profiling database, Profiling and Tuning dominate the compilation, requiring around 3 hours. With a pre-computed database, Profiling becomes very fast, and only Tuning dominates the compilation, requiring around 1 hour. After evaluating 15 models in Table 5, the profiling database consists of around 22K profiling entries with each one including operators' information (e.g., operator types, shape, and their combinations) and the latency achieved.

3.4 Portability

Figure 10:
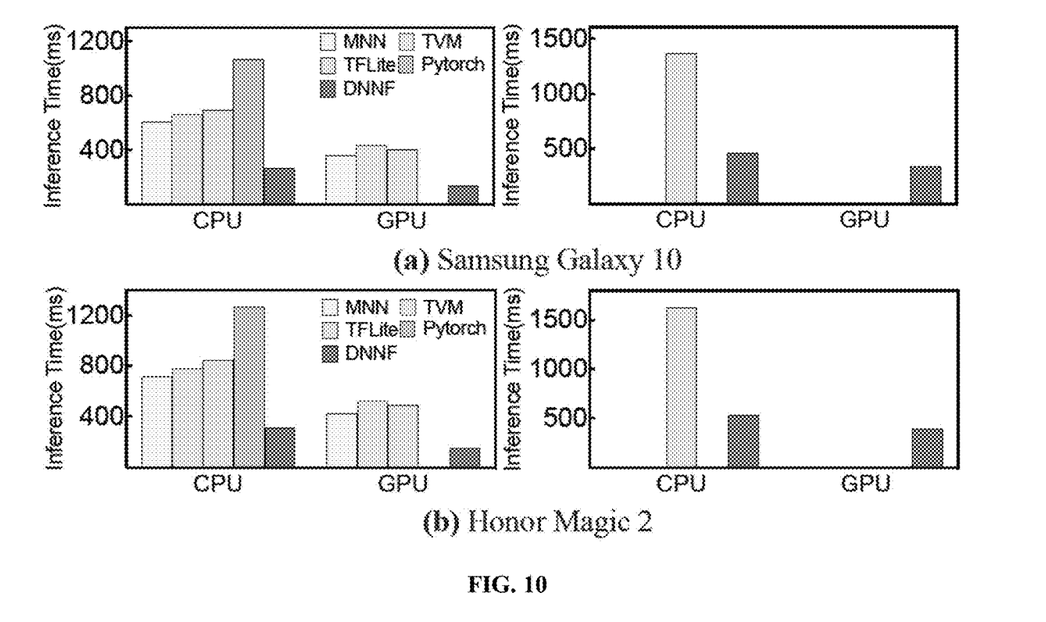
FIG. 10 illustrates the execution latency on additional cell phones (Samsung Galaxy S10 and Honor Magic 2) to demonstrate effective portability.

FIG. 10 shows the execution latency on additional cell phones (Samsung Galaxy S10 and Honor Magic 2) to demonstrate effective portability. Only YOLO-V4 and GPT-2 are reported due to limited space. Other models show similar trends. In particular, DNNFusion shows a more stable performance on older generations of mobile devices. This is because our fusion significantly reduces the overall number of layers and intermediate result size, and older cell phones with more restricted resources are more sensitive to these.

4. Related Work

Operator fusion in end-to-end mobile DNN frameworks. Operator fusion is an important optimization in many state-of-the-art end-to-end mobile DNN execution frameworks that are based on computational graphs, such as MNN, TVM, TensorFlow-Lite, and Pytorch. However, they all employ fixed-pattern fusion that is too restricted to cover diverse operators and layer connections in deep models like BERT—for example, ConvTranspose+ReLU+Concat cannot be recognized in TVM as it is not one of the specified patterns. Other examples that can be handled by DNNFusion and cannot be recognized by TVM include MatMul+Reshape+Transpose+Add in GPT-2, and Sub+Pow+Reduce-Mean+Add+Sq rt in TinyBERT. Comparing to these frameworks, DNNFusion works by classifying both the operators and their combinations, thus enabling a much larger set of optimizations.

Operator fusion on other ML frameworks. There are certain recent frameworks that rely on polyhedral analysis to optimize DNN computations and support operator fusion. R-Stream-TF shows a proof-of-concept adaptation of the R-Stream polyhedral compiler to TensorFlow. Tensor Comprehensions is an end-to-end compilation framework built on a domain-specific polyhedral analysis. These frameworks do not support mobile execution (i.e. ARM architecture), and thus we cannot perform a direct comparison between DNNFusion and them. As we have stated earlier, DNNFusion maintains an operator view but builds a higher-level abstraction on them. In the future, we can combine DNNFusion's high-level abstraction to existing domain-specific polyhedral analysis. Similarly, another promising direction will be to integrate DNNFusion into other compilation-based DNN frameworks or other popular general tensor/matrix/linear algebra computation frameworks, such as MLIR, Tiramisu, TACO, Halide, and LGen.

There also exist several other frameworks to optimize machine learning with operator fusion or fusion-based ideas. Closely related to DNNFusion-Rammer relies on fix-pattern operator fusion to further reduce kernel launch overhead of their optimized scheduling, Cortex proposes a set of optimizations based on kernel fusion for dynamic recursive models, TensorFlow XLA offers a more general fusion method than fix-pattern operator fusion by supporting reduce operations and element-wise operations, and TensorFlow Grapper provides an arithmetic optimizer that performs rewrites to achieve both fusion and arithmetic expression simplification (e.g., a×b+a×c=a×(b+c)). Comparing with these frameworks, DNNFusion works by classifying the operators and their combinations into several mapping categories, thus resulting in a more aggressive fusion plan and more performance gains. Elgamal and Boehm presently optimize general machine learning algorithms (e.g., SVM and Kmeans) with operator fusion. These efforts have both different targets and techniques compared to DNNFusion.

Polyhedral-based and other loop fusion methods. Polyhedral analysis is a prominent approach that offers a general and rigorous foundation for loop transformation and optimization.

Many existing efforts rely on a general polyhedral analysis to achieve optimized loop fusion. Pouchet et al. have demonstrated that polyhedral analysis can decompose the loop optimization problem into sub-problems that have much lower complexity, enabling optimal selection. The problem arising because of a large number of operators in our target applications (models) is quite different, and thus there does not seem to be a direct application of Pouchet et al.'s approach in our context. There have also been other loop fusion efforts targeting general programs. In contrast to these general efforts, DNNFusion is more domain-specific, leveraging the knowledge of DNN computations with a higher-level abstraction to explore more aggressive loop fusion opportunities.

What is claimed is:

1. A method for classifying deep neural network (DNN) operators, wherein the method is implemented by one or more electronic processor, and comprises:
    obtaining, by one or more processors, DNN operators including a first DNN operator;
    obtaining, a predetermined set of operator mapping types;
    analyzing, by one or more processors, the relationship between elements of an input of the first DNN operator and elements of its corresponding output; and
    determining a mapping type of the first DNN operator based on the analysis and the predetermined set of operator mapping types.

2. The method of claim 1, wherein the predetermined set of operator mapping types comprises one or more of: one-to-one, one-to-many, many-to-many, reorganize and shuffle.

3. The method of claim 2, wherein the one-to-one operator mapping type is a direct one-to-one mapping relationship between elements of the input and elements of the output.

4. The method of claim 2, wherein the one-to-many operator mapping type is a mapping relationship wherein each element of the input is used in generating multiple elements of the output.

5. The method of claim 2, wherein the many-to-many operator mapping type is a mapping relationship wherein each element of the input is used to generate multiple elements of the output and each element of the output is derived from a computation involving multiple elements of the input.

6. The method of claim 2, wherein the reorganize operator mapping type is a mapping relationship wherein the input and output are in different shapes but have the same elements if all elements of input and output are respectively collapsed into one dimension.

7. The method of claim 2, wherein the shuffle operator mapping type is a mapping relationship wherein each output element corresponds to an input element with the same value but the input and output differ in a one dimensional manner.

8. The method of claim 1, further comprising determining a transformation impedance of the mapping type, transformation impedance indicating a degree of fusion difficulty when the first operator is to be fused with another operator.

9. A method for accelerating execution of a deep neural networks (DNN), comprising:
    classifying operators of the DNN into a predefined plurality of mapping types based on the mapping relationship between input and output of each operator;
    generating an extended computational graph (ECG) for the DNN, wherein at least the mapping classification information of each operator of the DNN is included in the ECG representation;
    determining fusion probability for operations of the operators of the DNN based in part on the mapping types of any two fusing candidate operators of the DNN; and
    generating fusion plan for the DNN based at least in part on the determined fusion probability throughout the ECG.

10. The method of claim 9, wherein the mapping types comprises one or more of: one-to-one, one-to-many, many-to-many, reorganize and shuffle.

11. The method of claim 9, wherein the determining fusion probability comprises evaluating the desirability of any two fusing candidate operators according to the mapping types of both fusing candidate operators.

12. The method of claim 9, wherein the generating fusion plan comprises:
    rewriting the ECG by leveraging mathematical properties of the operations of the DNN through a predetermined graph rewriting rules;
    selecting a fusion seed operator from the rewritten ECG of the DNN;
    starting from the selected seed operator, recursively evaluating each operator and its immediate successor operator or operators through the rewritten ECG to determine whether a fusion is to be performed;
    starting from the selected seed operator, recursively evaluating each operator and its immediate predecessor operator or operators through the rewritten ECG to determine whether a fusion is to be performed.

13. The method of claim 9, further comprising:
    generating a data-flow tree from the rewritten ECG; and
    traversing the generated DFT to generate fused code for each pair of operators identified for fusion during the generating fusion plan.

* * * * *